United States Patent
Riley et al.

(10) Patent No.: US 8,561,523 B2
(45) Date of Patent: Oct. 22, 2013

(54) RECIPROCATING PUMP HAVING A PISTON ASSEMBLY

(75) Inventors: Andrew Dale Riley, Eufaula, OK (US); Randall Ferrain Weaver, Haywood, OK (US)

(73) Assignee: National Oilwell Varco, L.P., Houston, TX (US)

( * ) Notice: Subject to any disclaimer, the term of this patent is extended or adjusted under 35 U.S.C. 154(b) by 991 days.

(21) Appl. No.: 12/596,906

(22) PCT Filed: Apr. 23, 2008

(86) PCT No.: PCT/US2008/061314
§ 371 (c)(1),
(2), (4) Date: Dec. 4, 2009

(87) PCT Pub. No.: WO2008/131430
PCT Pub. Date: Oct. 30, 2008

(65) Prior Publication Data
US 2010/0074780 A1 Mar. 25, 2010

Related U.S. Application Data

(60) Provisional application No. 60/913,407, filed on Apr. 23, 2007.

(51) Int. Cl.
*F16J 1/06* (2006.01)
(52) U.S. Cl.
USPC .................................. 92/240; 92/251; 92/254
(58) Field of Classification Search
USPC ............................ 92/240, 244, 249, 251, 254
See application file for complete search history.

(56) References Cited

U.S. PATENT DOCUMENTS

| | | | | | |
|---|---|---|---|---|---|
| 2,890,918 | A | * | 6/1959 | Oldham | 92/251 |
| 2,987,353 | A | * | 6/1961 | Smith | 92/251 |
| 3,131,611 | A | * | 5/1964 | McLaughlin | 92/244 |
| 4,143,586 | A | * | 3/1979 | Zitting | 92/240 |
| 4,459,899 | A | * | 7/1984 | Richardson | 92/249 |
| 4,601,235 | A | * | 7/1986 | Roberts | 92/245 |
| 5,284,084 | A | * | 2/1994 | Pippert et al. | 92/241 |
| 5,480,163 | A | * | 1/1996 | Miser et al. | 92/254 |
| 5,960,700 | A | * | 10/1999 | Staggs et al. | 92/240 |
| 6,193,481 | B1 | | 2/2001 | Alaze et al. | |
| 6,893,481 | B2 | | 5/2005 | Nam et al. | |
| 7,168,361 | B1 | * | 1/2007 | Blume | 92/240 |
| 2003/0024386 | A1 | * | 2/2003 | Burke | 92/240 |

OTHER PUBLICATIONS

The State Intellectual Property Office of the People's Republic of China; Application No. 200880013338.3; Notification of First Office Action dated Nov. 9, 2010 (12 pages).
PCT International Search Report and Written Opinion for appl. No. PCT/US2008/061314 dated Sep. 5, 2008; (6 p.).

* cited by examiner

*Primary Examiner* — Thomas E Lazo
(74) *Attorney, Agent, or Firm* — Conley Rose, P.C.

(57) ABSTRACT

A reciprocating pump including a piston is disclosed. In some embodiments, the piston includes an annular hub, a flexible sealing element coupled to an outer surface of the hub, and a sleeve seated on the outer surface of the hub adjacent the sealing element. The sleeve is axially moveable relative to the hub to compress the sealing element. The sealing element includes a lip, which is displaced radially outward when the sleeve compresses the sealing element.

20 Claims, 4 Drawing Sheets

RECIPROCATING PUMP HAVING A PISTON ASSEMBLY

STATEMENT REGARDING FEDERALLY SPONSORED RESEARCH OR DEVELOPMENT

Not applicable

BACKGROUND

1. Field of Art

The disclosure relates generally to reciprocating pumps, including mud pumps used in the recovery of oil and gas. More particularly, the disclosure relates to piston components for reducing wear to pump piston expendables and limiting leakage in the event of piston seal failure.

2. Description of Related Art

Mud pumps are commonly used for conveying drilling mud during well drilling operations, such as for the recovery of oil and gas. Because of the need to pump the drilling mud through several thousand feet of drill pipe, such pumps typically operate at high pressures. Also, it is necessary for the drilling mud to emerge from the drill bit at a high flow rate in order to provide lubrication and cooling to the bit and to provide a vehicle for removal of drill cuttings from the earth formation being drilled. Further, the pressure generated by the mud pump contributes to the total downhole pressure, which is used to prevent well blowouts.

Mud pump components, such as the piston, cylinder and sealing element, are susceptible to a high degree of wear during use because the drilling mud is highly pressurized and relatively dense with a high proportion of suspended abrasive solids. As the cylinder becomes worn, the small annular space between the cylinder wall and the piston increases substantially and sometimes irregularly. Moreover, the combined effect of the high-pressure, abrasive nature of the drilling mud and the frictional forces resulting from the reciprocating contact between the piston and the cylinder wall is especially harmful to the sealing element. As the piston moves, edges of the sealing element experience wear and may become damaged. In some instances, the frictional force may be sufficient to cause the sealing element to detach from the piston. Additionally, the sealing element is susceptible to impact and abrasion damage due to direct exposure to the drilling mud.

Because these components experience high wear rates, it is often necessary to replace them on a regular basis. When replacing these components, the mud pump must be deactivated, which interrupts the drilling operation and thus increases drilling time and cost. Accordingly, means for reducing wear to pump components to increase the service life of the mud pump and reduce drilling downtime are desirable. It would be advantageous if such means limit leakage in the event of sealing element failure so as to allow the pump to continue to operate for some time, rather than requiring immediate servicing or replacement.

SUMMARY OF THE DISCLOSED EMBODIMENTS

A reciprocating pump having a piston assembly is disclosed. In some embodiments, the piston includes an annular hub having an outer surface, a flexible sealing element coupled to the outer surface of the hub, and a sleeve seated on the outer surface of the hub adjacent the sealing element. The sleeve is axially moveable relative to the hub to compress the sealing element. The sealing element has a lip, which is displaced radially outward when the sleeve compresses the sealing element.

In some embodiments, the pump includes a piston having an axial throughbore and a rod inserted through the throughbore. The piston includes an annular hub having an outer surface, a flexible sealing element coupled to the outer surface of the hub, and a sleeve seated on the outer surface of the hub adjacent the sealing element. The sealing element includes a front face having with an angled portion and a substantially vertical portion. The surface area of the vertical portion is less than ten percent of the combined surface area of the vertical and angled portions. The sleeve is axially moveable relative to the hub to compress the sealing element over the angled portion of the front face of the sealing element.

In some embodiments, the pump includes a cylinder and a piston moveably disposed within the cylinder. The piston includes an annular hub having an outer surface, a flexible sealing element coupled to the outer surface of the hub, and a sleeve seated on the outer surface of the hub adjacent the sealing element. The sleeve is axially moveable relative to the hub to compress the sealing element. The sealing element has an angled face. The sleeve has an angled face which is substantially parallel to and in contact with the angled face of the sealing element. An angle between a normal vector extending from the angled face of the sealing element and a line extending from the angled face of the sealing element and parallel to a longitudinal axis of the piston is acute.

Thus, embodiments described herein comprise a combination of features intended to enable enhancement of certain prior pumps and pump components. The various features and characteristics described above, as well as others, will be readily apparent to those skilled in the art upon reading the following detailed description of the preferred embodiments, and by referring to the accompanying drawings.

BRIEF DESCRIPTION OF THE DRAWINGS

For a detailed description of the preferred embodiments of the disclosed embodiments, reference will now be made to the accompanying drawings in which.

DETAILED DESCRIPTION OF THE DISCLOSED EMBODIMENTS

Figure 1:
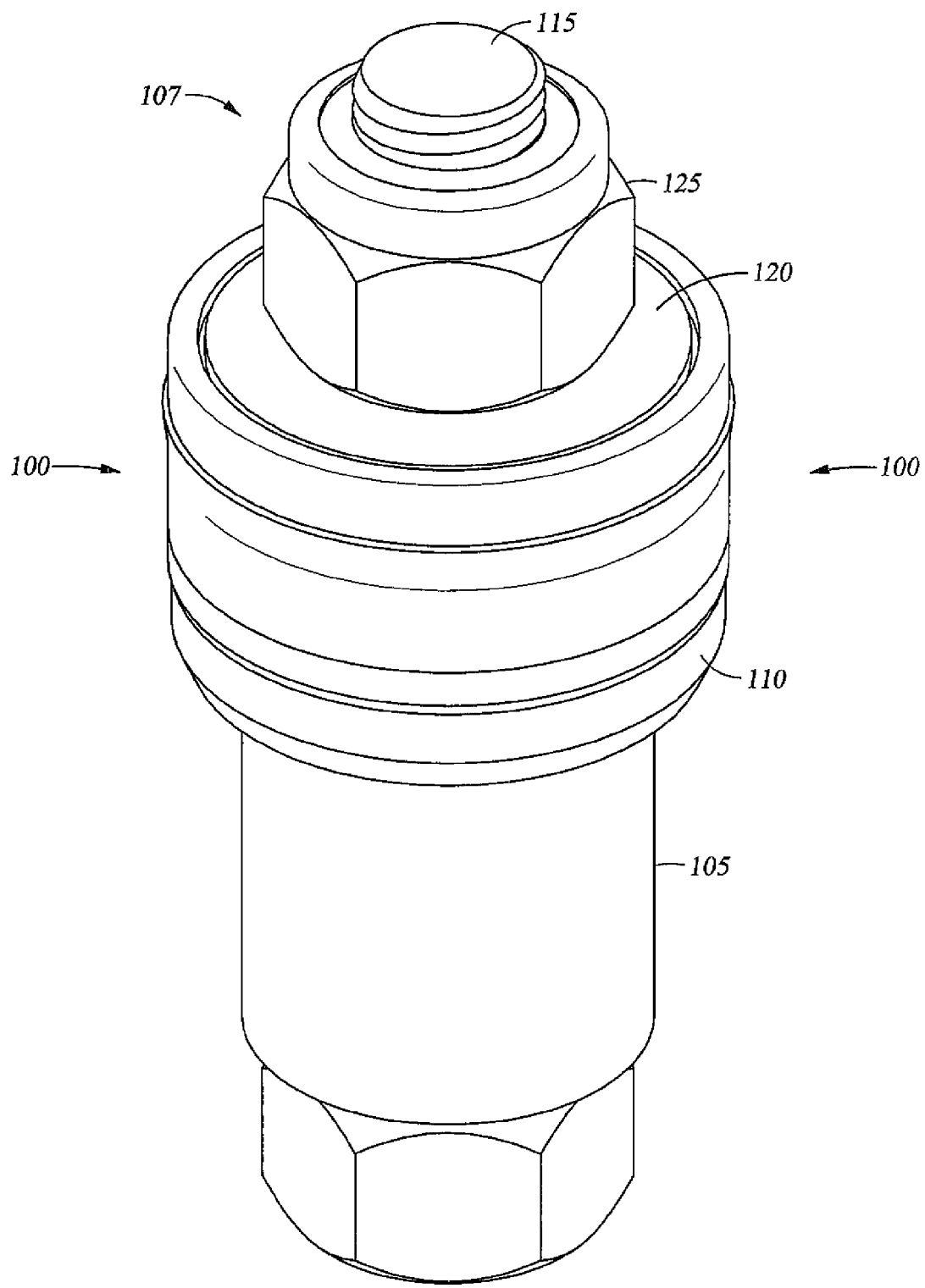
FIG. 1 is a perspective view of a piston rod assembly including a piston assembly in accordance with the principles described herein.

The following discussion is directed to various exemplary embodiments of the invention. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to suggest that the scope of the disclosure, including the claims, is limited to that embodiment.

Certain terms are used throughout the following description and claims to refer to particular features or components.

As one skilled in the art will appreciate, different persons may refer to the same feature or component by different names. This document does not intend to distinguish between components or features that differ in name but not function or structure. The drawing figures are not necessarily to scale. Certain features and components herein may be shown exaggerated in scale or in somewhat schematic form, and some details of conventional elements may not be shown in interest of clarity and conciseness.

In the following discussion and in the claims, the terms "including" and "comprising" are used in an open-ended fashion, and thus are to be interpreted to mean "including, but not limited to." Also, the term "couple" or "couples" is intended to mean either an indirect or direct connection. Thus, if a first device couples to a second device, that connection may be through a direct connection, or through an indirect connection via other devices and connections. Further, the terms "axial" and "axially" generally mean along or parallel to a central or longitudinal axis, while the terms "radial" and "radially" generally mean perpendicular to a central longitudinal axis.

Referring now to FIG. 1, piston rod assembly 100 includes a rod 105 disposed within a piston 110. A retainer 107 couples piston 110 to rod 105. In this embodiment, retainer 107 includes a washer 120 and a nut 125 threaded onto an end 115 of rod 105.

Figure 2:
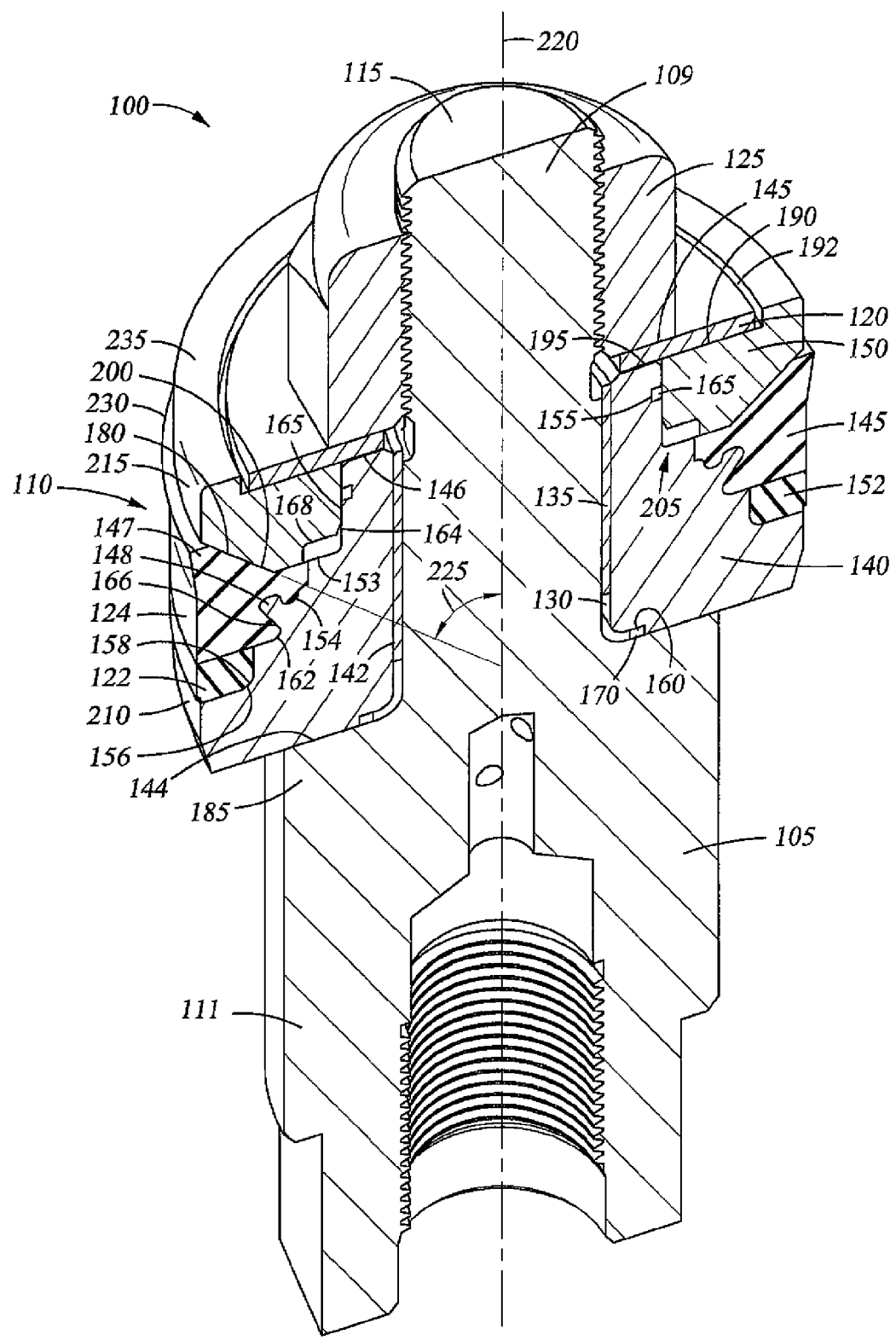
FIG. 2 is a cross-sectional view of the piston rod assembly of FIG. 1.

Turning to FIG. 2, annular piston 110 includes an axial throughbore 130 configured to receive rod 105, as shown. Rod 105 includes an elongate extension 109 connected to a base portion 111. The base portion has a diameter greater than that of the extension and thereby forms a shoulder 185 against which piston 110 is seated. To ensure a snug fit between rod 105 and piston 110, a bushing 135 is disposed between the two components. Bushing 135 is a generally tubular member, having a central opening receiving extension 109 of rod 105. Bushing 135 has an outer diameter slightly less than the inner diameter of axial throughbore 130 of piston 110. Bushing 135 allows piston rods of varying sizes, including rod 105, to be used in combination with a single-size piston, such as piston 110. In some embodiments, bushing 135 may not be employed.

Piston 110 further includes a piston hub 140, a piston seal 145, a pressure sleeve 150 and ring 152, all of which are annular in shape. Piston hub 140 includes an inner, generally cylindrical surface 142 engaging bushing 135, a generally planar surface 144 engaging shoulder 185 of rod 105, a generally planar surface 146 proximate washer 120 and an outer, generally cylindrical surface 210 extending from planar surface 144. Piston hub 140 further includes an irregularly shaped surface 154 extending between outer surface 210 and planar surface 146.

Piston hub 140 further includes annular grooves 155, 160 at the intersection of planar surface 144 and inner surface 142 and in irregular surface 154 proximate planar surface 146, respectively. Grooves 155, 160 are configured to receive annular sealing elements 165, 170, respectively. In some embodiments, including those illustrated by FIG. 2, sealing elements 165, 170 are o-rings. Sealing elements 165, 170 are referred to herein as sleeve seal 165 and shoulder seal 170, respectively.

Irregular surface 154 of piston hub 140 is shaped to receive ring 152, piston seal 145 and pressure sleeve 150. To enable such, irregular surface 154 includes (as viewed in cross-section or as shown in FIG. 2) a curved surface 156 proximate outer surface 210, a generally planar surface 164 proximate planar surface 146, and a surface 162 extending therebetween. Curved surface 156 is configured to receive a mating surface 158 on ring 152 so as to allow ring 152 to seat on piston hub 140 abutting outer surface 210, as shown.

Ring 152 further includes a step 122 along its outer surface 124. The portion of outer surface 124 to one side of step 122 and proximate piston hub 140 is substantially in alignment with surface 210 of piston hub 140. The portion of outer surface 124 to the other side of step 122 and proximate piston seal 145 is substantially in alignment with the outer surface 126 of piston seal 145, thus enabling ring 152 to prevent piston seal 145 from extruding between piston hub 140 and a surrounding cylinder (not shown) when piston rod assembly 100 is installed within a pump. In some embodiments, piston 110 does not include ring 152. Instead, piston seal 145 may be enlarged to fill the volume that would otherwise be occupied by ring 152 and engage curved surface 156 of piston hub 140, abutting surface 210 of piston hub 140. Alternatively, piston hub 140 may be enlarged to fill the volume that is occupied by ring 152, as shown in FIG. 2.

Surface 162 is configured to couple with an interlocking opposing or mating surface 166 on piston seal 145 and includes an annular extending lip 148 and a step 153. Lip 148 is configured for insertion into mating surface 166 on piston seal 145 so as to allow coupling of piston seal 145 to piston hub 140 adjacent ring 152, also as shown. Although piston hub 140 and piston seal 145 are mechanically coupled by interlocking surfaces 162, 166 in this embodiment, alternatively these components may be bonded together using a bonding agent.

Piston seal 145 includes a radially extending lip 147 proximate pressure sleeve 150, a front face 180 over which pressure sleeve 150 contacts piston seal 145, as will be described, and an exposed front face 230, which extends radially beyond front face 180 but is not contacted by pressure sleeve 150. In the embodiment of FIG. 2, the surface area of front face 230 is approximately 25% of the combined surface areas of front face 230 and front face 180. This percentage may vary, but it is generally desirable that the surface area of front face 230 be no more than 30% of the combined surface area of faces 230, 180. When piston rod assembly 100 is installed in a reciprocating pump and that pump is operating to pressurize a fluid, the fluid contacts piston 110 over front face 230 of piston seal 145. By configuring front face 230 such that its surface area is no more than 30% of the combined surface area of front faces 230, 180, and thus minimizing the surface area of piston seal 145 that is exposed to the fluid, meaning the surface area of exposed front face 230, the amount of damage that may be sustained by piston seal 145 from direct exposure to the fluid may be reduced and the service life of piston seal 145 prolonged.

Planar surface 164 configured so as to allow pressure sleeve 150 to seat on piston hub 140 between piston seal 145 and washer 120. Pressure sleeve 150 is axially moveable over planar surface 164 of piston hub 140 between piston seal 145 and washer 120. As will be understood, tightening of nut 125 against washer 120 and, in turn, against pressure sleeve 150 translates sleeve 150 toward piston hub 140 as pressure sleeve 150 compresses piston seal 145. Pressure sleeve 150 includes a front face 235, a generally cylindrical outer surface 215, a step 168, and a recess 192 for receiving washer 120, as shown. Recess 192 is bounded on one side by face 190 in contact with washer 120. When piston rod assembly 100 is installed in a reciprocating pump and that pump is operational to pressurize a fluid, the fluid contacts piston 110 also over front face 235 of pressure sleeve 150.

The interface between piston seal 145 and pressure sleeve 150 is angled relative to a central axis 220 through piston rod assembly 100. The angular nature of this interface allows pressure sleeve 150 to energize piston 145, meaning pressure sleeve 150 causes lip 147 of piston seal 145 to displace radially outward when pressure sleeve 150 translates against piston seal 145. To enable piston seal 145 to displace in this manner, angle 225 between front face 180 of piston seal 145 and axis 220 is preferably acute. In the embodiment depicted in FIG. 2, angle 225 is approximately 45 degrees.

The outer diameter of piston seal 145 at lip 147 is configured such that it exceeds the inner diameter of a pump cylinder (not shown) within which piston rod assembly 100 may be installed. In other words, the outer diameter of piston seal 145 at lip 147 is selected to provide an interference fit between piston seal 145 and the surrounding cylinder. An interference fit between piston seal 145 and the pump cylinder ensures a seal between the two components.

Piston seal 145 of piston 110 and a surrounding pump cylinder (see FIG. 4) are selected such that there is an initial interference of 0.030 to 0.090 inches between piston seal 145 at lip 147 and the inner surface of the cylinder after these components are assembled within a pump but prior to start up and operation of the pump. In the embodiments shown in FIGS. 1 and 2, piston seal 145 provides an initial interference of 0.060 inches. Once the pump becomes operational, piston seal 145 begins to experience wear, and pressure sleeve 150 energizes piston seal 145 against the cylinder to maintain a seal at this location as lip 147 of piston seal 145 is worn away. By comparison, in many conventional pumps, there is typically 0.200 inches of initial interference between a conventional piston and a surrounding pump cylinder. This comparatively larger interference is provided in order to maintain a seal between the piston, which does not energize the sealing element included therein, and the cylinder as the sealing element is worn away. The greater this interference, the lower the pump efficiency because the pump must work harder to overcome frictional forces between the piston and cylinder. Thus, an interference fit of 0.060 inches between piston seal 145 and a surrounding pump cylinder enables improved pump efficiency as compared to that of conventional pistons.

Surface 210 of piston hub 140 and surface 215 of pressure sleeve 150 are referred to herein as throttling surfaces 210, 215. The outer diameters of piston hub 140 and pressure sleeve 150 at throttling surfaces 210, 215, respectively, are configured to be slightly less than the inner diameter of the pump cylinder (again not shown). The nominal clearance between throttling surface 210 and the pump cylinder is preferably in the range 0.008 to 0.060 inches, while the nominal clearance between throttling surface 215 and the pump cylinder is preferably in the range 0.040 to 0.080 inches.

In the embodiment shown, piston hub 140 and pressure sleeve 150 are preferably made of metal. In some embodiments, these components are made of stainless steel. Piston seal 145, on the other hand, is preferably made of a resilient material, such as an elastomer. In some embodiments, piston seal 145 is made of polyurethane. Ring 152 comprises a harder material, compared to that of piston seal 145, to prevent piston seal 145 from extruding, as previously described. In some embodiments, ring 152 is made of nylon.

To assemble piston 110, sleeve seal 165 is inserted into groove 155 of piston hub 140, and ring 152 is positioned against surface 156 of piston hub 140. Piston seal 145 is coupled to piston 140 adjacent ring 152 by inserting lip 148 of piston hub 140 into mating surface 166 of piston seal 145 to interlock these components together. Pressure sleeve 150 is positioned on piston hub 140 over groove 155, now containing sleeve seal 165, and in contact with face 180 of piston seal 145. Upon assembling piston hub 140, piston seal 145, and pressure sleeve 150 in this manner, an annular space or volume 205 is formed between piston hub 140 and pressure sleeve 150 by steps 153, 168 formed in these components. As will be described, the clearance between piston hub 140 and pressure sleeve 150 represented by volume 205 allows pressure sleeve 150 to translate axially over surface 164 of piston hub 140 toward piston seal 145 so as to compress and energize piston seal 145. Without such clearance, pressure sleeve 205 would be prevented from translating axially over surface 164 of piston hub 140 toward piston seal 145.

To assemble piston rod assembly 100, shoulder seal 170 is inserted into groove 160 of piston hub 140, and bushing 135, if needed, is inserted over rod 105. Rod 105 with bushing 135, if present, is inserted through axial throughbore 130 of piston 110 until piston hub 140 of piston 110 abuts a shoulder 185 of rod 105. Washer 120 is slid over end 115 of rod 105, and nut 125 is then threaded onto end 115. As nut 125 is tightened on threaded end 115, washer 120 initially contacts piston 110 along a face 190 of pressure sleeve 150. At this point in the assembly procedure, a gap 195 exists between washer 120 and piston hub 140.

Continued threading of nut 125 along end 115 of rod 105 against washer 120 causes washer 120 to translate axially along rod 105 until gap 195 is closed. This axial movement of washer 120 also causes pressure sleeve 150 to translate axially, thereby compressing piston seal 145 along face 180. After gap 195 is closed, continued threading of nut 125 causes washer 120 to load piston hub 140 against shoulder 185 of rod 105 and pressure sleeve 150 to further compress piston seal 145 along face 180, thereby energizing piston seal 145. As described above, energizing piston seal 145 causes annular lip 147 to displace radially outward.

Loading of pressure sleeve 150 against face 180 of piston seal 145 creates a pressure seal 200 at this location. Pressure seal 200 prevents fluid leakage between face 180 of piston seal 145 and pressure sleeve 150. Sleeve seal 165 prevents fluid leakage between pressure sleeve 150 and piston hub 140. Together pressure seal 200 and sleeve seal 165 prevent fluid flow into volume 205 between piston hub 140, piston seal 145 and pressure sleeve 150. In the absence of pressure seal 200 and/or sleeve seal 165, fluid, such as pressurized drilling mud, would pass between piston seal 145 and pressure sleeve 150 and/or between pressure sleeve 150 and piston hub 140 into volume 205 and act to push piston seal 145 and pressure sleeve 150 apart. Thus, seals 200, 165 enable pressure sleeve 150 to continuously load face 180 of piston seal 145. Due to the angular nature of face 180, continuous loading of pressure sleeve 150 against piston seal 145 causes lip 147 of piston seal 145 to displace radially outward against the pump cylinder (not shown) and maintain a seal between piston 110 and the cylinder.

Figure 3:
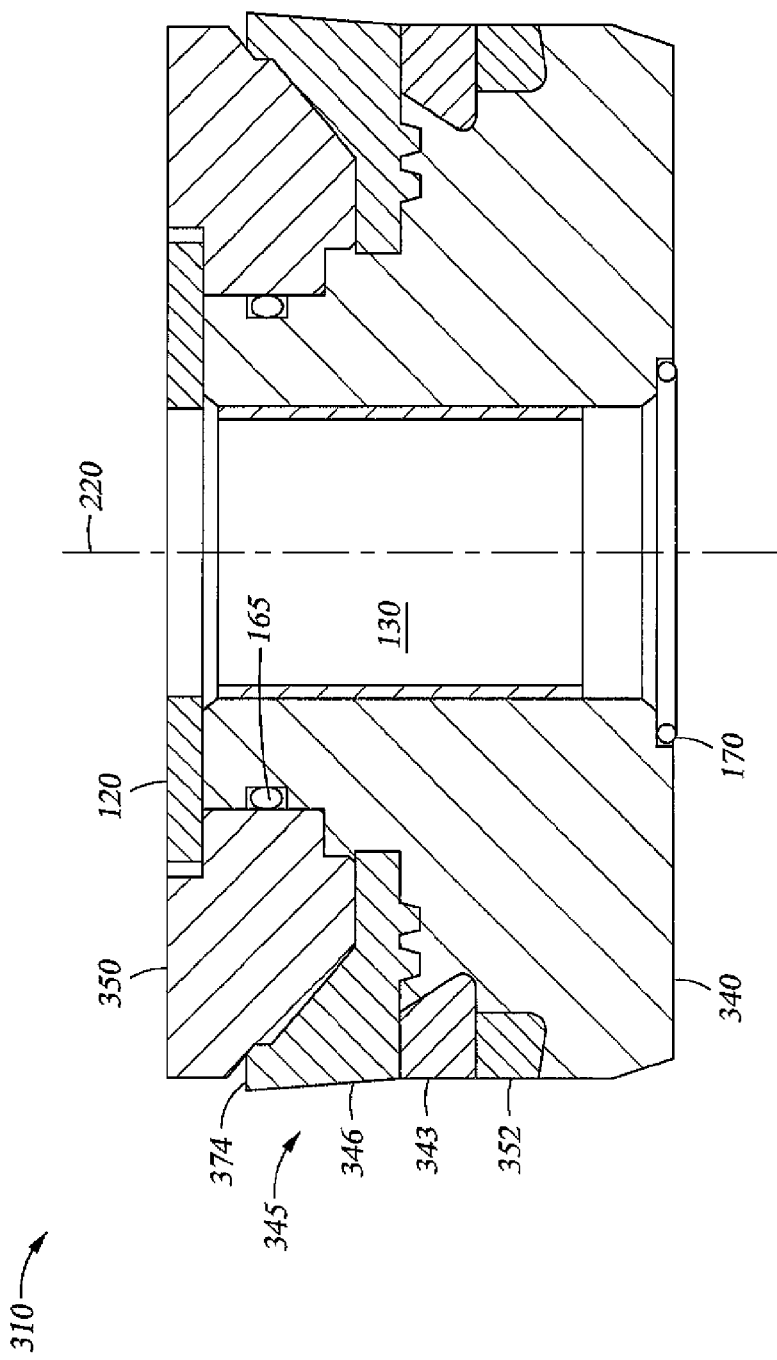
FIG. 3 is a cross-sectional view of another embodiment of a piston assembly in accordance with the principles described herein.

One of ordinary skill in the art will readily appreciate that the components of piston 110 may take other forms while still performing the same functions. FIG. 3 depicts another embodiment of a piston. As shown, piston 310 includes pressure sleeve 350, piston seal 345 and piston hub 340. Also, piston seal 345 is a dual hardness seal having a first portion 343 and a second portion 346, wherein the first portion 343 and the second portion 346 comprise materials having different hardness properties, such that the material of second portion 343 is harder than that of first portion 346. In some embodiments, first portion 343 and second portion 346 comprise different polyurethanes. This difference in material properties slows the wearing of piston seal 345 once first portion 346 has been worn away. In the embodiment of FIG. 3, first portion 346 comprises a 90 shore A elastomer, and second portion 343 comprises a 50 shore D elastomer.

Despite these differences, piston 310, and components thereof, are functionally equivalent to piston 110 and its subcomponents.

A piston in accordance with the principles disclosed herein, such as piston 110 or piston 310, may be coupled to a rod to form a piston rod assembly. Embodiments of a piston rod assembly, including assembly 100 illustrated in FIGS. 1-3, find application in pumps, and in particular, mud pumps used in connection with well drilling operations.

Figure 4:
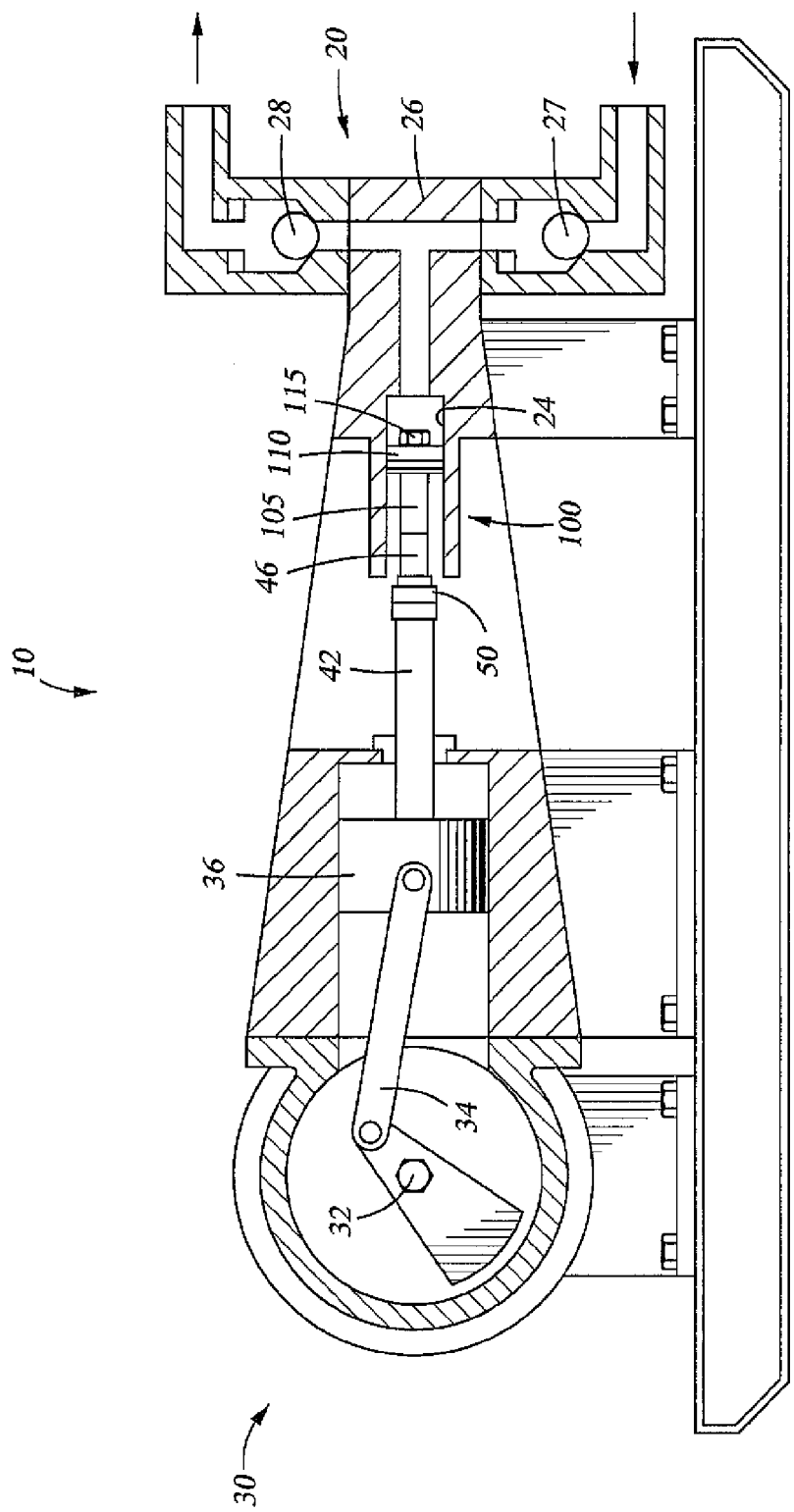
FIG. 4 is a cross-sectional view of a reciprocating pump including a piston and rod assembly in accordance with the principles described herein.

Turning to FIG. 4, reciprocating mud pump 10 includes a fluid end 20 and a power end 30. Fluid end 20 includes a piston, which in this example is piston 110, shown in and described with reference to FIGS. 1 and 2. It will be understood that, instead of piston 110, pump 10 may instead include piston 310, shown in and described with reference to FIG. 3. Fluid end 20 further includes cylinder liner 24, module 26, intake valve 27 and outlet valve 28. Power end 30 includes a crankshaft 32, connecting rod 34 and crosshead 36. Fluid end 20 is coupled to power end 30 by an extension rod 42, rod sub 46 and rod 105, also shown in and described with reference to FIGS. 1 and 2. Extension rod 42 connects to crosshead 36 and is coupled via clamp 50 and rod sub 46 to rod 105, which connects to piston 110. Although extension rod 42 is coupled to rod sub 46 by clamp 50 in this embodiment, these components may be coupled by other equivalent means, such as but not limited to a threaded connection. As previously described, rod 105 with piston 110 coupled thereto forms piston rod assembly 100.

When piston rod assembly 100 is installed within mud pump 10, as shown, piston seal 145 (FIG. 2) of piston 110 is interference fit within cylinder 24. The interference between lip 147 of piston seal 145 ensures a seal between piston 110 and surrounding cylinder 24. Also, the interference ensures that, during pump operation, wear to piston 110 caused by contact between piston 110 and cylinder 24 occurs at lip 147 of piston seal 145, rather than other components of piston 110, such as pressure sleeve 150 or piston hub 140.

During operation, reciprocating mud pump 10 draws drilling mud through intake valve 27 into module 26 where the drilling mud is pressurized by piston 110. Drilling fluid is then expelled at high pressure from pump 10 through outlet valve 28. During this pressurization process, piston rod assembly 100 is exposed to the pressurized drilling mud at end 115 (FIGS. 2 and 4). However, due to the nature of its design, pressure sleeve 150 protects piston seal 145 from the pressurized drilling mud. Pressure sleeve 150 covers all but face 230 of piston seal 145. Thus, piston seal 145 is protected for the most part by pressure sleeve 150 from exposure to the pressurized drilling mud. With regard to pressurized drilling mud that does pass pressure sleeve 150 between throttling surface 215 and cylinder 24, its volume is reduced by the small clearance between throttling surface 215 and cylinder 24 before impacting face 230 of piston seal 145. The combined effect of pressure sleeve 150 and throttling surface 215 reduces impact and abrasion damage to piston seal 145 caused by the pressurized drilling mud and the debris suspended therein, and, in turn, prolongs the service life of piston 110 and allowing pump 10 to operate longer.

Over time, the reciprocating motion of pump 10 and the flow of the pressurized drilling mud within pump 10 cause wear to piston 110. In particular, lip 147 of piston seal 145 is worn away. To maintain a seal between piston 110 and cylinder 24, pressure sleeve 150 continuously energizes piston seal 145 against cylinder 24. The pressurized drilling mud contacts pressure sleeve 150 along front face 235, applying a pressure load to face 235. Pressure sleeve 150 responds by axially translating over surface 164 of piston hub 140 and pushing against face 180 of piston seal 145. Translation of pressure sleeve 150 in this manner is enabled by the clearance between piston hub 140 and pressure sleeve 150 represented by volume 205. Due to the angular nature of face 180 of piston seal 145 and the camming action achieved via the angled interface between pressure sleeve 150 and piston seal 145, axial movement of pressure sleeve 150 against piston seal 145 causes piston seal 145, in particular lip 147, to displace radially outward and to seal against cylinder 24. Thus, axial movement of pressure sleeve 150 caused by the pressurized drilling mud ensures that piston seal 145 is energized and that, as lip 147 of piston seal 145 is worn away, piston seal 145 displaces to provide new material for wear purposes and to maintain the seal between piston 110 and cylinder 24.

In the event that piston seal 145 fails to provide a seal between piston 110 and cylinder 24 during operation of mud pump 10, the small clearances between surfaces 210, 215 and cylinder 24 "throttle" or choke the flow of drilling mud between piston 110 and cylinder 24, thereby limiting leakage caused by the failure. Thus, throttling surfaces 210, 215 enable mud pump 10 to continue operating for some period of time after seal failure, and postpone the need for immediate servicing or replacement of piston seal 145.

While various embodiments have been shown and described, modifications thereof can be made by one skilled in the art without departing from the scope or teachings herein. The embodiments described herein are exemplary only and are not limiting. Many variations and modifications of the system and apparatus are possible and are within the scope of the invention. For example, the relative dimensions of various parts and the materials from which the various parts are made can be varied. Accordingly, the scope of protection is not limited to the embodiments specifically described herein, but is only limited by the claims that follow, the scope of which shall include all equivalents of the subject matter of the claims.

What is claimed is:

1. A piston having a central axis and comprising:
  an annular hub having a first end, a second end, a throughbore extending axially between the first and second ends, and a radially outer surface;
  a flexible sealing element having a radially inner surface slidably engaging the radially outer surface of said hub, said sealing element having a lip; and
  a sleeve slidably engaging the outer surface of said hub adjacent said sealing element and axially moveable relative to said hub to compress said sealing element;
  wherein the lip of said sealing element is displaced radially outward when said sealing element is compressed by said sleeve;
  wherein said hub further comprises a groove in the outer surface adjacent said sleeve and wherein a seal is disposed in the groove.

2. The piston of claim 1, wherein said sleeve and said sealing element each further comprise an angled face, wherein the angled face of said sleeve contacts the angled face of said sealing element when said sleeve compresses said sealing element.

3. The piston of claim 2, wherein an angle between a normal vector extending from the angled face of said sealing element and a line extending from the angled face of said sealing element and parallel to a longitudinal axis of the piston is acute.

4. The piston of claim 3, wherein the angled face of said sealing element is substantially parallel to the angled face of said sleeve.

5. The piston of claim 2, wherein the angled face of said pressure sleeve and the angled face of said piston seal comprise a pressure seal therebetween.

6. The piston of claim 2, wherein the lip comprises a front face that extends from the angled face of said sealing element, wherein the surface area of the front face is less than ten percent of the combined surface area of the angled face of said sealing element and the front face of said sealing element.

7. The piston assembly of claim 1, wherein an outer diameter of the lip exceeds outer diameters of said hub and said pressure sleeve.

8. The piston of claim 1, further comprising a ring seated on the outer surface of said hub between a flanged end of said hub and said sealing element, the ring configured to limit extrusion of said sealing element when compressed by said sleeve.

9. The piston of claim 1, where said sealing element comprises a first portion having a first hardness and a second portion having a second hardness, wherein the first hardness exceeds the second hardness.

10. A piston rod assembly having a central axis, the assembly comprising:
    a piston comprising:
        an annular hub having a first end, a second end, a throughbore extending axially between the first and second ends, and a radially outer surface;
        a flexible sealing element coupled to the outer surface of the hub, the sealing element having a radially inner surface slidably engaging the radially outer surface of the hub, the sealing element having a lip and a front face comprising an angled portion and a substantially planar portion extending radially outward from the angled portion, wherein the surface area of the substantially horizontal portion is less than ten percent of the combined surface area of the substantially horizontal portion and the angled portion; and
        a sleeve having a radially inner surface slidably engaging the outer surface of the hub adjacent the sealing element, wherein the sleeve is configured to move axially relative to the hub and slidably engage the angled portion of the front face of the sealing element to compress the sealing element;
        wherein the lip of said sealing element is displaced radially outward when said sealing element is compressed by said sleeve;
        wherein said hub further comprises a groove in the outer surface adjacent said sleeve and wherein a seal is disposed in the groove; and
    a rod extending through the axial throughbore of the hub.

11. The piston rod assembly of claim 10, further comprising a retainer coupling said piston to said rod.

12. The piston rod assembly of claim 11, wherein said retainer is a nut threaded onto said rod.

13. A pump comprising:
    a cylinder; and
    a piston moveably disposed within said cylinder, said piston having a central axis and comprising:
        an annular hub having a first end, a second end, a throughbore extending axially between the first and second ends, and a radially outer surface;
        a flexible sealing element coupled to the outer surface of the hub, the sealing element having a radially inner surface slidably engaging the radially outer surface of the hub, a lip, and an angled face; and
        a sleeve slidably engaging the outer surface of the hub adjacent the sealing element and axially moveable relative to the hub to compress the sealing element, the sleeve having an angled face substantially parallel to the angled face of the sealing element and in contact with the angled face of the sealing element;
        wherein an angle between a normal vector extending from the angled face of the sealing element and a line extending from the angled face of the sealing element and parallel to a longitudinal axis of the piston is acute;
        wherein the lip of said sealing element is displaced radially outward when said sealing element is compressed by said sleeve;
        wherein said hub further comprises a groove in the outer surface adjacent said sleeve and wherein a seal is disposed in the groove.

14. The pump of claim 13, wherein the hub further comprises a second outer surface, wherein a clearance between the second outer surface of the sleeve and said cylinder limit fluid flow therebetween.

15. The pump of claim 13, wherein the annular hub further comprises a third outer surface, wherein a clearance between the third outer surface of the hub and said cylinder is configured to limit fluid flow therebetween.

16. The pump of claim 13, wherein the lip is displaced radially outward against said cylinder when the sealing element is compressed by the sleeve.

17. The pump of claim 16, wherein an outer diameter of the sealing element at the lip is greater than an inner diameter of said cylinder.

18. The pump of claim 17, wherein an initial interference between the inner diameter of the cylinder and the inner diameter of the sealing element at the lip is less than or equal to 0.060 inches prior to initial start up of the pump.

19. The pump of claim 13, wherein the sealing element comprises a first portion having a first hardness and a second portion having a second hardness, wherein the first hardness exceeds the second hardness.

20. The pump of claim 13, wherein said piston further comprises an annular ring disposed between a flanged end of the hub and the sealing element, the ring configured to limit extrusion of the sealing element when compressed by the sleeve.

* * * * *